(12) United States Patent
Kuc et al.

(10) Patent No.: US 8,954,062 B2
(45) Date of Patent: Feb. 10, 2015

(54) METHOD FOR LOADING A LIST OF PREFERRED NETWORKS INTO A SECURE ELEMENT CONTAINED IN A MOBILE TERMINAL

(75) Inventors: Jean-François Kuc, La Destrousse (FR); Lionel Merrien, Montreal (CA)

(73) Assignee: Gemalto SA, Meudon (FR)

( * ) Notice: Subject to any disclaimer, the term of this patent is extended or adjusted under 35 U.S.C. 154(b) by 199 days.

(21) Appl. No.: 13/577,171

(22) PCT Filed: Feb. 2, 2011

(86) PCT No.: PCT/EP2011/051496
§ 371 (c)(1),
(2), (4) Date: Jan. 23, 2013

(87) PCT Pub. No.: WO2011/095524
PCT Pub. Date: Aug. 11, 2011

(65) Prior Publication Data
US 2013/0115942 A1    May 9, 2013

(30) Foreign Application Priority Data

Feb. 4, 2010    (EP) .................................... 10305118

(51) Int. Cl.
*H04W 48/18* (2009.01)
*H04W 8/20* (2009.01)

(52) U.S. Cl.
CPC .............. *H04W 48/18* (2013.01); *H04W 8/205* (2013.01)
USPC ................... 455/432.1; 455/435.2; 455/435.1; 455/558; 370/395.2

(58) Field of Classification Search
CPC ..... H04W 48/18; H04W 48/20; H04B 1/3816
USPC .......... 455/432.1, 432.2, 432.3, 435.1, 435.2, 455/418, 558; 370/331, 332, 395.2, 395.21, 370/395.52; 709/224, 225, 226
See application file for complete search history.

(56) References Cited

U.S. PATENT DOCUMENTS 7,349,695 B2 * 3/2008 Oommen et al. .......... 455/432.1
7,603,119 B1   10/2009 Durig et al.
(Continued)

FOREIGN PATENT DOCUMENTS

WO    WO 2009/042670 A1    4/2009

OTHER PUBLICATIONS

International Search Report (PCT/ISA/210) issued on Feb. 28, 2011, by the European Patent Office as the International Searching Authority for International Application No. PCT/EP2011/051496.
(Continued)

*Primary Examiner* — Kashif Siddiqui
*Assistant Examiner* — Farideh Madani
(74) *Attorney, Agent, or Firm* — Buchanan Ingersoll & Rooney PC

(57) ABSTRACT

The invention relates to a method for loading a list of preferred networks into a secure element contained in a mobile terminal. The loading is accomplished when the secure element detects that it is in a roaming condition within a telecommunication network. The method consists of: i) asking (12) for an IP channel to be opened between the telecommunication network and the secure element, the request for opening originating with the secure element; ii) requesting (13) the loading of the list of preferred networks; iii) uploading (14) via the IP channel the list of preferred networks into the secure element; and iv) transmitting (16) a request by the secure element to the mobile terminal to use one of said preferred networks in said list.

6 Claims, 1 Drawing Sheet

(56) References Cited

U.S. PATENT DOCUMENTS

2002/0160763 A1* 10/2002 Mittal et al. ............ 455/418
2004/0236849 A1* 11/2004 Cooper et al. ........... 709/224
2005/0259673 A1* 11/2005 Lu et al. ................. 370/419
2005/0282544 A1* 12/2005 Oommen et al. ........ 455/432.1
2009/0082019 A1 3/2009 Marsico

OTHER PUBLICATIONS http://fr.wikipedia.org/wiki/International_Mobile_Subscriber_Identity (English language version also attached) (7 total pages), Last modified Jul. 11, 2012.

* cited by examiner

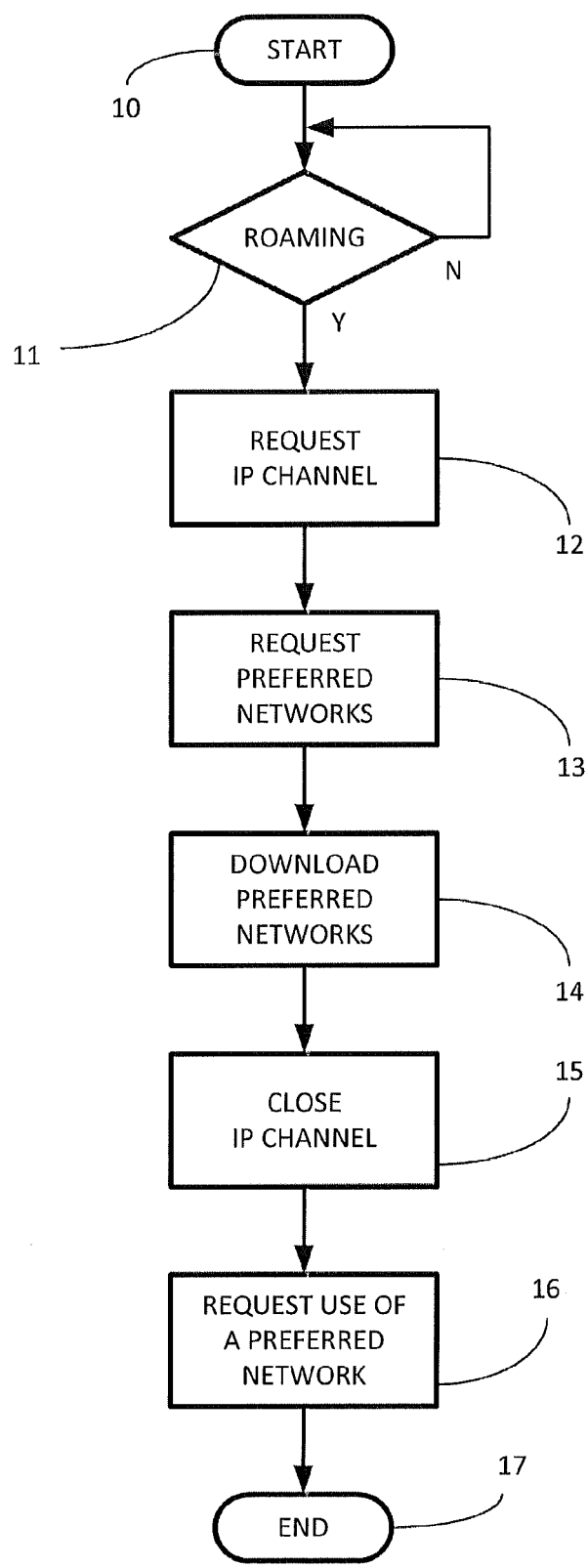

METHOD FOR LOADING A LIST OF PREFERRED NETWORKS INTO A SECURE ELEMENT CONTAINED IN A MOBILE TERMINAL

The field of the invention is the field of telecommunications in cell networks, of the 3G (Universal Mobile Telecommunications System "UMTS") or LTE (Long Term Evolution) types.

More precisely, the present invention relates to a method for loading a list of preferred networks into a secure element such as a UICC—Universal Identification Circuit Component—card. A UICC is a component containing a telecommunication operating system which can embed SIM (Subscriber Identification Module) applications for the GSM system, USIM (Universal SIM) system, or RUIM (Removable Universal identification Module) for the CDMA (Code Division Multiple Access) system.

An UICC card is contained in a mobile terminal operating in a network of a matching type. It can also be fixedly (i.e. not removeably) integrated in the mobile terminal.

The loading of a list of preferred networks into a secure element is typically accomplished when the terminal is in a roaming condition.

Roaming makes it possible to use a mobile terminal, for instance of the GSM type and containing a secure element composed of a UICC card, almost everywhere in the world without changing the call number. The roaming principle is based on a voluntary cooperation between the operators of telecommunications networks in the whole world, which sign bilateral agreements to accept the clients of one of them on the network of another one of them, and generally vice versa. A mobile terminal including a secure element from a given operator will not be allowed to register with, (and thus operate) on another operator's network unless such an agreement exists between the two operators.

In practice, as soon as a user of a mobile terminal powers it on, wherever it is, the mobile carries out the scanning of the channels of the radio bands it supports, while drawing up the list of the operators operating the networks it has detected. Then it tries, as a priority, to register with the last network it used (stored in the LOCI (Location Information) 7F20:6F7E file of the UICC card), or, failing so, with the networks mentioned in the list of the preferred networks of the card (PLMN 7F20:6F30 file). It will however avoid trying to register with the networks, the MCC-MNC codes of which (Mobile Country Code-Mobile Network Code, see for instance the http://fr.wikipedia.org/wiki/International_Mobile_Subscriber_Identity site) are placed in the list of the prohibited networks (FPLMN 7F20:6F7B file of the UICC card). Such prohibited networks are those which the operator of the network the user registered with, has not signed a roaming agreement.

When a network recognizes the IMSI (International Mobile Subscriber Identity) of a foreign UICC card, it interrogates the operator the MCC-MNC code of which is mentioned thereon. If the IMSI exists in the HLR (Home Location Register) of the operator, and provides for a right of access to the foreign network (thanks to a roaming agreement in force), then the operator having emitted the UICC card supplies its partner with a RND-SRES (Random Number-Signed Response) couple which will make it possible to locally carry out an authentication without knowing the Ki key.

A temporary TMSI identity is then assigned to the mobile and will be substituted for its IMSI for the next registrations or locations: the mobile will now be recognized by the VLR (Visitor Location Register) of the local operator. It will thus be able to emit calls (sometimes with some restrictions), directly using the network of the country where it is located, which will bill these to the emitter of the SIM card which, in turn, will debit these from its client's account, in real time or non-real time.

In a GSM network, the networks mentioned in the list of the card preferred networks are either downloaded by Short Message Service "SMS" (via OTA—Over The Air), into the card or recorded during the issuance of the UICC card. The loading by SMS OTA can thus be accomplished upon arrival in a foreign country.

The downloading via OTA of a list of preferred networks into a secure element of a mobile terminal in a roaming condition thus assumes the transmission of a SMS from the user's subscriber network, such SMS being relayed by the roaming network. Now, in a fourth generation network, for instance of the LTE type, all the communications are of the IP (Internet Protocol) type and no SMS is used. Therefore, it is not possible to send a SMS to the secure element (UICC) giving the list of the preferred networks.

The present invention aims at remedying such drawback.

More precisely, one object of the present invention is to propose a method making it possible for a mobile terminal in a roaming condition, containing a secure element, and operating in a wholly IP of the LTE type network, to receive a list of preferred networks (and which will be stored in the secure element), in order to make it possible for the mobile terminal to get connected with one of such preferred networks (generally the first one in the list, if the latter provides a radio coverage in the zone where the mobile terminal is located).

Such aim, as well as others which will appear in the following, is reached thanks to a method for loading a list of preferred networks into a secure element contained in a mobile terminal, with the loading being accomplished when the secure element detects that it is in a roaming condition within a telecommunication network. According to the invention, the method consists of:

i) asking for an IP channel to be opened between the telecommunication network and the secure element, with the request for opening originating with the secure element;
ii) requesting the loading of the list of preferred networks;
iii) uploading via the IP channel the list of preferred networks into the secure element;
iv) transmitting a request by the secure element to the mobile terminal to use one of the preferred networks in the list.

Advantageously, the method consists of closing the IP channel between the steps iii and iv.

In a preferred embodiment, the secure element is a chip card which can be removed from the mobile terminal.

In another preferred embodiment, the secure element belongs to the mobile terminal.

The invention can be applied to a telecommunication network of the UMTS or LTE types.

Other particularities and advantages of the invention will appear when reading an advantageous embodiment of the invention, which is given as an illustration and not a limitation, and referring to the unique appended drawing showing the steps of this advantageous embodiment of the invention.

The scope of the present invention relates to a mobile terminal operating in a telecommunications network of the IP type. The mobile terminal contains a secure element such as an UICC card as mentioned in the introduction, and this card can also be an element integrated in the mobile terminal, and thus not removable therefrom. The considered mobile terminal is in a roaming condition in the telecommunications network and it is thus necessary to send it a list of preferred networks on a different channel than a SMS.

In the single FIGURE, step 10 is a start step.

During step 11, the secure element checks whether it is in a roaming condition. It makes this test regularly until it detects that it actually is in a roaming condition. When this roaming condition has been detected on a network of the LTE (4G) or UMTS (3G) types, the secure element asks, during step 12, for an IP channel to be opened between said telecommunication network and said secure element. This request is transmitted to the network though the mobile terminal. As the UICC cannot have a fixed IP address, the UICC asks for the IP channel to be opened. The network then assigns it an IP address. An IP telecommunication channel is thus opened between the network and the secure element upon completion of the step 12.

During step 13, the secure element asks the network for a loading of the step of the preferred networks of its original operator. Such list contains the networks of the operators with which the original operator has signed roaming agreements.

Upon reception of this request, the network with which the mobile terminal has subscribed downloads, during step 14, and through the open IP channel, the list of the preferred networks into the secure element.

During an optional step 15, the IP channel is closed, either on the initiative of the secure element, or on the initiative of the network, once the latter has checked that the loading of the list of the preferred networks into the secure element has been completed correctly.

During a step 16, the secure element transmits to the mobile terminal a request for the latter to use the new list of preferred networks and to be connected to the preferred network of the visited country.

Further to step 16, the mobile terminal is connected to one of the preferred networks of its original operator.

Step 17 is an end step.

If the optional step 15 is not implemented, the IP channel is not closed. The procedure which, during step 16, consists in requesting the terminal to use the preferred network, will then close the IP channel. As a matter of fact, the secure element will ask the terminal to repeat its initialisation phase.

The telecommunication network wherein the present invention applies is a UMTS or a LTE network. In the case of a UMTS network, the SMSs exist and the invention aims at supplying an alternative solution to the utilisation of SMSs for the transmission of lists of preferred networks. In the case of a LTE network, IP channels only can be opened for communications between a secure element and the network.

The invention claimed is:

1. A method for loading a list of preferred networks into a secure element contained in a mobile terminal while said secure element is in a roaming condition within a telecommunication network, comprising:
   detecting, by said secure element, when the secure element is in the roaming condition within the telecommunication network; and
   upon detecting that said secure element is in the roaming condition within the telecommunication network,
      (i) asking for an Internet Protocol (IP) channel to be opened between said telecommunication network and said secure element, with said request for opening originating from said secure element;
      (ii) requesting, by the secure element, the loading of said list of preferred networks from the telecommunication network;
      (iii) uploading via said IP channel said list of preferred networks into said secure element; and
      (iv) transmitting a request by said secure element to said mobile terminal to connect to one of said preferred networks in said list.

2. The method according to claim 1, further comprising closing said IP channel between the steps iii and iv.

3. The method according to claim 1, wherein said secure element is a chip card which is removeable from said mobile terminal.

4. The method according to claim 1, wherein said secure element forms part of said mobile terminal.

5. The method according to claim 1, wherein said telecommunication network is a Universal Mobile Telecommunications System (UMTS) network.

6. The method according to claim 1, wherein said telecommunication network is a Long Term Evolution (LTE) network.

* * * * *